(12) United States Patent
Bridel et al.

(10) Patent No.: US 11,056,691 B2
(45) Date of Patent: Jul. 6, 2021

(54) SILICON-CARBON COMPOSITE PARTICULATE MATERIAL

(71) Applicants: COMMISSARIAT A L'ENERGIE ATOMIQUE ET AUX ENERGIES ALTERNATIVES, Paris (FR); UMICORE, Brussels (BE)

(72) Inventors: Jean-Sebastien Bridel, Seoul (KR); Tim Van Rompaey, Leuven (BE); Vincent Caldeira, Grenoble (FR); Agnes Brun, Champagnier (FR); Jean-Francois Colin, Meylan (FR); Cedric Haon, Grenoble (FR)

(73) Assignees: COMMISSARIAT A L'ENERGIE ATOMIQUE ET AUX ENERGIES ALTERNATIVES, Paris (FR); UMICORE, Brussels (BE)

( * ) Notice: Subject to any disclaimer, the term of this patent is extended or adjusted under 35 U.S.C. 154(b) by 93 days.

(21) Appl. No.: 15/746,188

(22) PCT Filed: Jul. 19, 2016

(86) PCT No.: PCT/EP2016/067168
§ 371 (c)(1),
(2) Date: Jan. 19, 2018

(87) PCT Pub. No.: WO2017/013111
PCT Pub. Date: Jan. 26, 2017

(65) Prior Publication Data
US 2018/0241037 A1    Aug. 23, 2018

(30) Foreign Application Priority Data

Jul. 20, 2015 (EP) .................................. 15306176

(51) Int. Cl.
*H01M 4/587*   (2010.01)
*H01M 10/0525* (2010.01)
(Continued)

(52) U.S. Cl.
CPC ......... *H01M 4/587* (2013.01); *H01M 4/0471* (2013.01); *H01M 4/133* (2013.01); (Continued)

(58) Field of Classification Search
CPC .. H01M 4/587; H01M 4/386; H01M 10/0525; H01M 4/364; H01M 4/1395; (Continued)

(56) References Cited

U.S. PATENT DOCUMENTS

2012/0171574 A1* 7/2012 Zhamu ..................... H01M 4/13
                                                429/300
2013/0252082 A1* 9/2013 Thompkins ............ H01G 11/42
                                                429/188

(Continued)

FOREIGN PATENT DOCUMENTS

CN  102306757 A   1/2012
CN  102637872 A   8/2012
(Continued)

OTHER PUBLICATIONS

English machine translation of KR20130107892 (Year: 2013).*
(Continued)

*Primary Examiner* — Lisa S Park
(74) *Attorney, Agent, or Firm* — Shumaker, Loop & Kendrick, LLP

(57) ABSTRACT

The present invention relates to an electrochemically active Si-carbon composite particulate material, wherein silicon nanoparticles are entrapped in a carbon matrix material based on at least micronic graphite particles, reduced graphene platelets and amorphous carbon.

14 Claims, 2 Drawing Sheets

(51) Int. Cl.
| | | |
|---|---|---|
| *H01M 4/04* | (2006.01) | |
| *H01M 4/133* | (2010.01) | |
| *H01M 4/1395* | (2010.01) | |
| *H01M 4/36* | (2006.01) | |
| *H01M 4/38* | (2006.01) | |
| *H01M 4/134* | (2010.01) | |
| *H01M 4/1393* | (2010.01) | |

(52) U.S. Cl.
CPC ......... *H01M 4/134* (2013.01); *H01M 4/1393* (2013.01); *H01M 4/1395* (2013.01); *H01M 4/364* (2013.01); *H01M 4/386* (2013.01); *H01M 10/0525* (2013.01)

(58) Field of Classification Search
CPC .... H01M 4/1393; H01M 4/134; H01M 4/133; H01M 4/0471; H01M 4/62; C01B 33/02; C01B 32/20; C01B 32/05; C01B 32/182
See application file for complete search history.

(56) References Cited

U.S. PATENT DOCUMENTS

| | | | | |
|---|---|---|---|---|
| 2014/0212762 A1* | 7/2014 | Nakamura | ............ | H01M 4/587 429/231.8 |
| 2015/0076742 A1* | 3/2015 | Joo | ............ | D01D 1/02 264/433 |
| 2016/0197345 A1* | 7/2016 | Tamaki | ............ | H01M 4/362 429/231.8 |
| 2016/0365567 A1* | 12/2016 | Troegel | ............ | H01M 10/0525 |

FOREIGN PATENT DOCUMENTS

| | | |
|---|---|---|
| CN | 103050666 A | 4/2013 |
| CN | 103311526 A | 9/2013 |
| CN | 10300970 A | 11/2013 |
| CN | 103474667 A | 12/2013 |
| CN | 102306757 B | 7/2014 |
| CN | 103972483 A | 8/2014 |
| CN | 104332613 A | 2/2015 |
| CN | 104716312 A | 6/2015 |
| CN | 104752696 A | 7/2015 |
| CN | 1104868107 A | 8/2015 |
| EP | 2760067 A1 | 7/2014 |
| KR | 20130107892 A | 10/2013 |
| KR | 20140085822 A | 7/2014 |
| WO | 2008/064741 A1 | 6/2008 |
| WO | 2012/000858 A1 | 5/2012 |

OTHER PUBLICATIONS

International Search Report for PCT/EP2016/067168 dated Nov. 11, 2016 (4 pages).
Gan Lei et al., "A facile synthesis of graphite/silicon/graphene spherical composite anode for lithium-ion batteries", Electrochimica ACTA, vol. 104, p. 117-123, Aug. 2013 (7 pages).
Min Zhou et al. "Graphene/Carbon-Coated Si Nanoparticle Hybrids as High-Performance Anode Materials for Li-Ion Batteries", ACS Applied Materials & Interfaces, vol. 5, p. 3449-3455, Mar. 2013 (7 pages).
EP Office Action for EP Application No. 16741012.5-1201 dated Mar. 31, 2020 (7 pages).
CN Office Action for CN Application No. 201680042650.X dated Mar. 23, 2020 (20 pages).

* cited by examiner

SILICON-CARBON COMPOSITE PARTICULATE MATERIAL

TECHNICAL FIELD AND BACKGROUND

The instant invention relates to the field of lithium-ion batteries and more particularly is directed to a new electroactive composite particulate material for manufacturing negative electrodes ("anodes") particularly interesting for increasing the performances of Li-ion cells.

Lithium-ion batteries are the most widely used secondary systems for portable electronic devices. Compared to aqueous rechargeable cells, such as nickel-cadmium and nickel metal hydride, Li-ion batteries (or cells) have higher energy density, higher operating voltages, lower self-discharge and low maintenance requirements. These properties have made Li-ion cells the highest performing available secondary battery.

Graphitic carbon is a material particularly useful for manufacturing negative electrodes ("anodes") for Li-ion cells. It distinguishes by its stable cycle properties and its very high safety with regard to handling in comparison with other materials such as lithium metal, used in so-called "lithium batteries". A disadvantage however of graphitic carbon lies in its electrochemical capacity (theoretically 372 mAh/g), which is much lower than that lithium metal (theoretically 4,235 mAh/g).

Accordingly, investigations are continuously in progress for identifying new materials for the negative electrode of Li-ion cells.

Thus, Si-based negative electrode materials were developed. In effect, this type of material could provide significantly enhanced energy densities. Silicon has a large theoretical gravimetric capacity (3,579 mAh/g) corresponding to the following reaction: $15Li+4Si \rightarrow Li_{15}Si_4$ and a large volumetric capacity (2,200 mAh/cm$^3$) also.

However, the microscopic structure of silicon based materials and their huge volume expansion upon lithium intercalation had not yet allowed reaching acceptable life characteristics for their use in Li-ion cells. The large volume expansion of the Si-based materials during Li incorporation may induce stresses in the Si material, which in turn could lead to a mechanical degradation of the Si material and a continuous degradation of electrolyte.

Regarding the undesirable effect due to volume expansion of the Si-based materials during Li incorporation, it is already proposed to use composite particles in which the Si domains are embedded in a matrix material and more specifically by using carbon materials.

Unfortunately, the available composites materials for Si-based electrodes are not quite satisfactory. They still suffer from the effects of Si-swelling, reducing the battery storage capacity relatively quickly over time, thus limiting the lifetime, and limiting the volumetric storage capacity by only allowing a relatively low volumetric Si content in the electrode.

To overcome some of the above mentioned drawback of silicon based materials, submicron (nano-) scale of silicon based powders were also prepared, The use of silicon particles having an average domain size smaller than 500 nm preferably smaller than 200 nm, and more preferably smaller than 150 nm, as electrochemically active material may prove a viable solution. Advantageously, such particles with a diameter smaller than 150 nm have not tendency to fracture upon cycling. A method to prepare such submicron silicon-based powders is a plasma technology, as disclosed in WO 2008/064741 A1.

The simultaneous use of carboxymethyl cellulose (CMC) instead of polyvinylidene fluoride (PVDF) as an electrode binder allows also to achieve a better bonding between silicon nanoparticles, resulting in better electrode unity and capacity retention.

SUMMARY

However, there is still a need for yet better negative electrodes that have the ability to further optimize the performance of Li-ion batteries. In particular, for most applications, negative electrodes having improved capacities and coulombic efficiencies are desirable.

The present invention is precisely intended to propose a new Si-carbon composite particulate material convenient for such a use.

DETAILED DESCRIPTION

In particular, the instant invention is directed to an electrochemically active Si-carbon composite particulate material, wherein silicon nanoparticles are entrapped in a carbon matrix material based on at least micronic graphite particles, reduced graphene platelets and amorphous carbon.

According to the invention, reduced graphene platelets are graphene platelets having an oxygen content less than 5% by weight.

More particularly, the third type of carbon (i.e. amorphous carbon) is issued from the pyrolization of at least one carbon-containing organic compound, and in particular a polymeric compound. Carbon issued from pyrolization of such a compound is also named "polymeric carbon".

Silicon carbon composites also called Si—C composites where the carbon materials are graphite, amorphous (so called disordered) carbon or graphene are already known. Thus, prior documents highlight the interest of graphene as matrix material for Si-particles. Improved capacity retention is effectively achieved [1, 2, 3, 4] but the initial coulombic efficiency remains lower than 80% which is detrimental for Li-ion batteries practical applications. Their main drawback is still the initial irreversible capacity.

In contrast, according to the knowledge of the inventors, the combination of the three components i.e. amorphous carbon, graphite and reduced graphene with silicon particles is novel.

As shown in the following examples, negative electrodes, based on the composite particulate material according to the invention, advantageously exhibit improved initial coulombic efficiency, retention capacity and lifetime of batteries incorporating them is increased.

The electrochemically activity of Si domains is improved in particular with respect to their level of protection towards the electrolyte contacts. It appears that the graphene and amorphous carbon of the matrix efficiently protect surface of the composite particles of the invention from extensive electrolyte degradation and allow keeping particles integrity and improving their lifetime. Thus, the SEI formation is significantly reduced even more avoided.

At last, the electrochemically active composite particulate material according to the invention, can efficiently incorporate, store and release lithium ions during battery's charge and discharge cycles.

The invention is also directed to a process for preparing the claimed electrochemically active composite particulate material.

More particularly, it relates to a process comprising at least the steps consisting to:

(i) having Si nanoparticles under a non agglomerate form,
(ii) contacting said Si nanoparticles with a solution containing at least one carbon-containing organic compound, a dispersion of micronic graphite particles and of reduced graphene or graphene oxide platelets,
(iii) drying the mixture of the previous step (ii) for forming a particulate material, which particles contain Si nanoparticles, graphite microparticles, reduced graphene and/or graphene oxide platelets, and the carbon-containing organic compound, and
(iv) thermally treating the particulate material of step (iii) in an oxygen-free atmosphere so that the carbon-containing organic compound decomposes and graphene oxide, if present, reduces for obtaining the expected Si-carbon composite particulate material.

Thus, the instant invention is also directed to the use of a Si-carbon composite particulate material of the invention as an electrochemically active material in particular in an electrode.

The invention is also directed to the use of the claimed composite particulate material for preparing an electrode and in particular a negative electrode.

It is also directed to an electrode comprising a Si-carbon composite particulate material of the invention as electrochemically active material.

It also relates to a lithium ion battery anode comprising a Si-carbon composite particulate material according to the invention.

The invention is also directed to a Li-ion battery using such a negative electrode of the instant invention.

Si-Carbon Composite Particulate Material of the Invention

The composite particulate material of the invention may be detailed as being formed of micronic graphite particles coated by silicon nanoparticles, reduced graphene platelets, and amorphous carbon. The amorphous carbon, used as a "glue", coats the Si-graphene-graphite particles.

This composite particulate material may be also designated in the instant disclosure under the abbreviation Si-carbon composite or Si-Graphene-Graphite-C (SiGnGtC).

A particle of a composite particulate material according to the invention is schematically represented in the FIG. 1.

The particles of the composite particulate material of the invention have preferably a distribution of size with 1 µm<D10<80 µm, 5 µm<D50<300 µm and 10 µm<D90<700 µm.

In particular, the specific surface area is measured with isotherm adsorption-desorption of $N_2$ at 77K after preheated for 1 h under a flow of argon at 150° C.

The particle size distribution (PSD) is measured with laser diffraction in a wet dispersion (mix demineralized water+5% ethanol).

The particles of the composite particulate material of the invention have advantageously a BET ranging from 1 to 50 $m^2/g$ and in particular of 2 to 30 $m^2/g$.

Si Nanoparticles

The nanosilicon particles entrapped in the carbon matrix material of the composite particulate material of the invention have preferably an average particle size between 20 and 200 nm and a distribution of size with 80 nm<D80<200 nm.

The nanosilicon particles have advantageously a BET ranging from 10 to 80 and in particular of 25 $m^2/g$.

These particles have also generally an open porous volume lower than 0.001 cc/g, and an oxygen content<4 wt %.

The open porous volume is evaluated by measurement with an ASAP equipment by isotherm adsorption-desorption of $N_2$ at 77K after preheated for 1 h under a flow of argon at 150° C.

Such submicronic sized Si particles may be advantageously prepared according to the process disclosed in the document WO2012-000858.

Carbon Matrix Material

As previously stated the carbon matrix material considered according to the invention comprises at least three types of carbon materials, i.e reduced graphene, graphite and amorphous carbon.

a) Graphene

Graphene is a two dimensional crystalline material, having a single atomic layer of carbon.

The reduced graphene platelets entrapped in the composite particulate material of the invention are in the form of a monolayer or of superimposed layers with not greater than 120 layers.

Preferentially, the reduced graphene platelets or sheets have a thickness ranging from 0.3 to 40 nm, and preferably from 0.3 to 15 nm.

Preferentially, the reduced graphene platelets have a surface area ranging from 20 to 300 $m^2/g$, and preferably from 50 to 150 $m^2/g$.

In the case of the invention, the reduced graphene may be preliminary obtained from the converting of the graphene oxide form. It may be also formed during the process of the invention from graphene oxide used as starting material. Reduced graphene may be also designated under the abbreviation Gn.

Recent works have shown that graphene can greatly improve the reversible capacity, cycling stability, and rate capability of Li-ion batteries electrodes as a conducting and buffering matrix. The benefit of this two-dimensional carbon nanomaterial relies on his improved electronic conductivity and mechanical properties making it enable to protect silicon surface from electrolyte contacts.

b) Graphite

Graphite is the most common form of carbon with a layered, planar structure. In each layer, the carbon atoms are arranged in a honeycomb lattice with separation of 0.142 nm, and the distance between planes is 0.335 nm. The stack of graphene differs from the graphite by the orientation between the layer of graphene. The stack of graphene hasn't any order between the single sheet of graphene. At the opposite, in the graphite the honeycomb lattice of the different graphene sheets are oriented.

The graphite considered according to the invention is under the form of micronic graphite particles.

These particles have preferably an average particle size between 1 and 20 µm.

This material may be also designated in the instant specification under the abbreviation Gt.

In the Si-carbon composite particulate material of the invention, the microparticles of graphite carry the submicronic silicon particles on their surface.

c) Carbon

Regarding the third type of carbon forming the carbon matrix material of the composite according to the invention it may be characterized as being amorphous by contrast to graphene.

It is issued from the thermal decomposition of a carbon-containing organic compound.

As source of carbon, may be in particular cited polymeric compounds, coal tar pitch, petroleum pitch, meso-phased pitch.

As polymeric compound convenient for the invention, it may be more particularly cited the polyvinylalcohol (PVA), polyacrylonitrile, styrene-based polymers, cellulosic polymers, epoxy resins, polyvinyl chloride, sucrose and combinations thereof.

This third type of carbon contributes with the graphene platelets to form a coating which may be mono- or few-layers, onto the Si-graphite particles and/or Si-graphite particles agglomerates. The so formed coating may cover said particles completely or partially.

The combination of the three types of carbon materials for forming a carbon matrix composite particulate material wherein are entrapped Si nanoparticles allows to achieve a conductive material exhibiting improved properties.

According to a preferred embodiment, the Si-carbon composite particulate material of the invention has a content in Si equal or greater to 13% by weight and in particular ranging from 8 to 30% by weight related to its total weight.

According to a preferred embodiment, the particles of the composite particulate material of the invention contain greater than 50% by weight and preferably greater than 60% by weight of graphite, combined preferably to lower than 20% by weight and preferably from 1% to 15% by weight of reduced graphene and preferably until 5% and preferably at least 10% by weight of amorphous carbon with respect to their total weight.

According to another advantageous embodiment, the carbon matrix material of the composite particulate material according to the invention is formed from 30 to 70 part by weight of graphite from 5 to 30 part by weight of graphene and from 5 to 20 part by weight of amorphous carbon issued from a carbon-containing organic compound.

According to another preferred embodiment, the Si-carbon composite particulate material of the invention comprises Silicon nanoparticles and micronic graphite particles in weight ratio Si/graphite from 0.05 to 0.8 and preferably from 0.1 to 0.3.

According to another preferred embodiment, the Si-carbon composite particulate material according to the invention comprises micronic graphite particles and reduced graphene platelets in a weight ratio graphite/graphene from 1 to 14 and preferably from 1.7 to 14.

According to another preferred embodiment, reduced graphene platelets and amorphous carbon are in weight ratio graphene/C from 0.25 to 6 and preferably from 0.5 to 3.

The graphene considered in the previous weight ratio is only the free reduced graphene, i.e. which is not incorporated in the graphite structure.

As Si-carbon composite particulate material of the invention may be in particular cited the following composites:

$Si_{13}Gt_{64}Gn_{13}C_{10}$, $Si_{10}Gt_{65}Gn_{14}C_{11}$, and $Si_{15}Gn_{15}Gt_{63}C_{7}$.

Process for Preparing a Composite Particulate Material of the Invention

The Si-carbon composite particulate material of the invention may be obtained by a process comprising at least the steps consisting to:

(i) having Si nanoparticles under a non agglomerate form, (ii) contacting said Si nanoparticles with a solution containing at least one carbon-containing organic compound and a dispersion of micronic graphite particles and of reduced graphene and/or graphene oxide platelets, (iii) drying the mixture of the previous step (ii) for forming a particulate material, which particles contain Si nanoparticles, micronic graphite particles, reduced graphene and/or graphene oxide platelets, and the carbon-containing organic compound, and (iv) thermally treating the particulate material of step (iii) so that the carbon-containing organic compound decomposes, and graphene oxide, if present, reduces for obtaining the expected Si-carbon composite particulate material.

Advantageously, the steps (i) to (iii) are conducted with an homogeneous dispersion of the solid particulate materials i.e. silicon nanoparticles, graphene platelets and micronic graphite particles. If necessary, the mixture of step (ii) may be submitted to a sonication to eliminate any phenomenon of aggregation before proceeding to the drying step.

Thus, to comply this requirement, Si-particles considered in step (i) may be obtained further to a preliminary treatment intended to eliminate all agglomerates which could be present in the starting Si powder material.

In particular, the claimed process may comprise preliminary steps consisting in:

providing an initial powder containing Si-based particles and aggregates thereof, and subjecting said initial powder to a de-agglomeration process for separating any agglomerate if presents.

This preliminary treatment may be performed by any usual method like for example sonication of a suspension of said initial powder. For example, the suspension may be sonicated during 2 to 3 min. at 500 W to disperse the agglomerated nanosilicon particles if present.

Regarding the carbon-containing organic compound, it interacts with the others material on a solid, soluble or liquid form.

As detailed here-above, it is intended to be incorporated in the Si-graphene-graphite particles for providing after its thermally decomposition, a carbon coating on these particles.

The interaction between all the materials is promoted by firstly, the optimization of the contact between the organic compound, the nanoplatelets of graphene and nanoparticles of Si and micronic graphite particles. This is generally obtained by mechanically mixing the solvent medium containing them for a time sufficient to have an homogenous suspension of all solid materials under a non-agglomerated form and subsequently the drying of this solvent medium to promote the formation of a precursor material of the expected Si-carbon composite particulate material.

The solvent phase convenient for the invention is firstly selected to provide a solute form of the carbon-containing organic compound.

Accordingly, it is chosen for having a chemical affinity with this compound. The man skilled in the art may proceed to its choice by considering the chemical nature of the carbon-containing organic compound. For example it may be a polar solvent like water or an aqueous solvent phase, for hydrosoluble carbon-containing organic compounds or a non polar solvent for hydrophobic carbon-containing organic compounds.

The solvent convenient for the invention may be selected among water, ethanol or derivatives thereof, THF, toluene and hexane.

Generally, the solid particulate materials (Silicon particles, graphene and graphite) are present in this solvent phase at a weight concentration ranging from 1 to 100 g/L and in particular ranging from 10 to 100 g/L.

The drying step is dedicated to eliminate the solvent phase and to promote the physical adherence between all the materials. More particularly, the silicon particles and the graphene platelets deposit on surface of the submicronic graphite particles and the organic compound under a soluble form interacts with the so-formed composite particulate material.

Thus the drying step (ii) may be conducted using a spray-drying, spray-pyrolysis, fluidized-bed drying procedure or any procedure that involves an atomization or aerosolizing step. Advantageously, it may be by spray-drying.

The experimental conditions of this drying step are adjusted for not altering the integrity of all the materials.

Thus, the present invention is also directed to a Si-carbon matrix particulate material comprising at least silicon nanoparticles, reduced graphene platelets and/or graphene oxide platelets, micronic graphite particles, aggregated ones to the others to form particles, said particles also incorporating at least one carbon-containing organic compound.

This carbon-containing organic compound is advantageously a polymeric compound as detailed here-above.

The step (iv) is more particularly dedicated to convert the carbon-containing organic compound in carbon and the graphen oxide if present in reduced graphene. This step of converting may be performed by a reductive treatment which may be chemical and preferably thermal.

This thermal treatment may comprise a sintering, heat treatment, spray pyrolysis, or fluidized bed drying procedure.

Advantageously, the treatment is conducted in an oxygen-free atmosphere.

The temperature of this treatment is adjusted to obtain the expected converting.

For example, it may consist in a heating in a tubular furnace for 16 hours at 200° C. under air, then 6 hours at 600° C. and 3 hours 1,000° C. under argon atmosphere.

Upon conversion, the graphene present in the composite particulate material of the invention has an oxygen content less than 5% by weight.

Applications of the Electrochemically Active Composite Particles of the Invention The electrochemically active composite particles are particularly useful for manufacturing electrodes and in particular negative electrodes ("anodes") for Li-ion cells Thus, the instant invention is also directed to the use of a Si-carbon composite particulate material as an electrochemically active material.

In particular, the composite particulate material of the invention may be used for forming a layer on a conductive support with any processing aids as known in the art, The layer can be deposited with any techniques, e.g. bar coating, screen printing, knife coating, roller coating, spin coating and the like.

The thickness of the layer varies with the geometry of the cell or battery and typically ranges from a few microns to several millimeters.

The instant invention also relates to an electrode comprising a Si-carbon composite particulate material of the invention as electrochemically active material.

This electrode is preferably a negative electrode.

As shown in the following examples, the Si-carbon composite particulate material of the invention provides advantageously high cycling performances. This is very likely linked to its improved electric conductivity and good ionic conductivity. It has, also a low volume expansion, a good tolerance to mechanical stress and a good Li-storage ability.

The invention is also directed to a lithium ion battery anode comprising a Si-carbon composite particulate material according to the invention.

The invention is also directed to a lithium ion battery comprising an electrode according to the invention.

The invention will be further explained with the following figures and examples without however being limited thereto.

REFERENCES

[1] Zhou et al., ACS Appl. Mater. Interfaces 2013, 5, 3449-3455;
[2] Gan et al., Electrochimica Acta 104 (2013) 117-123;
[3] CN103400970 (Published in 2013);
[4] CN102306757 (Published in 2012)].

WORKING EXAMPLES

Materials and Methods

Figure 1:
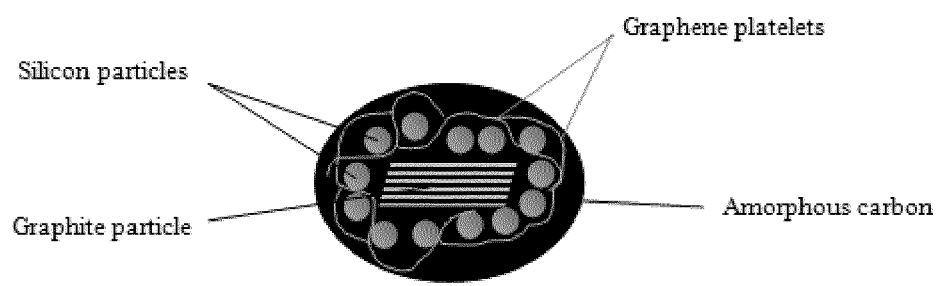
FIG. 1 represents a particle of Silicon-Graphite-Graphene-Carbon composites of the invention FIG. 2 SEM pictures with a coverage of silicon particles covered with graphene and carbon on the graphite surface.

The Graphene particles have an average particle diameter 15 μm, a BET surface 120 to 150 m$^2$/g and an average thickness of approximately 6 to 8 nanometers (M grade from XG SCIENCE).

The nanosilicon powder is made according to WO2012-000858. It has a BET of 25 m$^2$/g with an open porous volume lower than 0.001 cc/g (measurement done by ASAP equipment by isotherm adsorption-desorption of N2 at 77K after preheated for 1 h under a flow of argon at 150° C.), an oxygen content <4 wt %, a particle size defined as 80 nm<D80<200 nm and an initial negative zetapotential (defined at pH7 in water).

Graphite micropowder has a BET surface of 2.5 m$^2$/g (AF grade from SHOWA DENKO) or having a BET surface 16.1 m$^2$/g (SFG6 grade from TIMCAL).

PVA is poly(vinyl alcohol) MW 25,000 from POLYSCIENCE INC.

Pitch is a solid battery grade product.

The specific surface values are measured with isotherm adsorption-desorption of N2 at 77K after preheated for 1 h under a flow of argon at 150° C.

The particle size distribution (PSD) values are measured with laser diffraction in a wet dispersion (mix demineralized water+5% ethanol).

The electrochemical activities of the Si-carbon composite particulate materials prepared in the following examples are evaluated in coin cells CR2032. The working electrodes are prepared by mixing 80 wt % active materials (based on the dry residue) with 10% carbon black and 10% carboxymethyl cellulose (CMC) as binder in water to form homogeneous slurry, which is uniformly coated onto 10 μm thickness copper foil. The prepared working electrodes are punched with 14 mm diameter, pressed at 1T and dried in a vacuum system at 80° C. during 48 h. After that, electrochemical cells (CR2032) using a silicon carbon anode, a Villedon and a Celgard 2400 as separators, Li foil as the counter electrode and LiPF6 in ethylene carbonate/diethylcarbonate (1:1 by volume) with 2% vinylene carbonate and 10% fluoroethylene carbonate as electrolyte, are assembled in an Ar-filled glovebox. The coin cells are tested in a CCCV mode between 10 mV and 1 V at a C-rate of C/5 (meaning a full charge or discharge of 800 mAh/g of active material in 5 hours).

Example 1

0.6 Liter of demineralized water, in which 5.5 grams of graphene nanoplatelets are dispersed, is sonicated during 3 min at 500 W. Then, 6.1 grams of Silicon nanoparticles, 25.3 grams of graphite micropowder (BET surface 2.5 $m^2/g$) and 13.1 grams of Poly vinyl alcohol (PVA) (25,000 g/mol, 88% hydrolyzed) are added to the graphene nanoplatelets suspension and then stirred with a magnetic bar in order to solubilize the polymer.

The suspension is again sonicated during 2×3 min at 500 W to disperse the agglomerated nanosilicon. The suspension is then stirred with a magnetic bar during 30 mn to 3 hours. The suspension is then dried by spray drying and the obtained Si-Graphene-Graphite-PVA (SiGnGtPVA) is fired in a tubular furnace for 16 hours at 200° C. under air, then 6 hours at 600° C. and 3 hours 1,000° C. under argon atmosphere. This pyrolized product is milled by using a turbula.

Powder specifications of the Si-carbon composite particulate material are shown in table 1.

Their electrochemical performances are evaluated, as disclosed in the material and methods part, and the so obtained values are shown here-after in table 2.

Example 2

A composite Silicon-graphite-graphene-carbon is prepared as the example 1 but with a lower quantity in silicon nanoparticles.

In this example, 40 mL of demineralized water, in which 0.56 grams of graphene nanoplatelets are mixed with 0.4 grams of Silicon nanoparticles, 2.6 grams of graphite micropowder (BET surface 2.5 $m^2/g$) and 1.47 grams of PVA (25,000 g/mol, 88% hydrolyzed).

Powder specifications and electrochemical performances of the Si-carbon composite particulate material are respectively shown in tables 1 and 2.

Example 3

A composite Silicon-graphite-graphene-carbon is prepared as the example 1 but with a different graphite (BET surface 16.1 $m^2/g$).

Powder specifications and electrochemical performances of the Si-carbon composite particulate material are respectively shown in tables 1 and 2.

Example 4

A composite Silicon-graphite-graphene-carbon is prepared with a different graphene and drying process.

In this example, 0.1 Liter of demineralized water, in which 1 gram of graphene oxide suspension obtained by modified Hummers method using a graphene material (average particle diameter 5 μm, BET surface 50 to 80 $m^2/g$ and average thickness of approximately 15 nanometers) is sonicated during 1 min at 500 W. Then, 0.5 gram of Silicon nanoparticles, 2.1 grams of graphite micropowder (BET surface 2.5 $m^2/g$) and 1.1 grams of PVA (25,000 g/mol, 88% hydrolyzed) are added to the suspension and then stirred with a magnetic bar in order to solubilize the polymer.

The suspension is again sonicated during 1 min at 500 W to disperse the agglomerated nanosilicon. The suspension is then stirred with a magnetic bar during 30 mn to 3 hours.

The suspension is then freezed at −85° C. during 12 hours and dried by freeze drying process during 24 h to 48 h.

Figure 2:
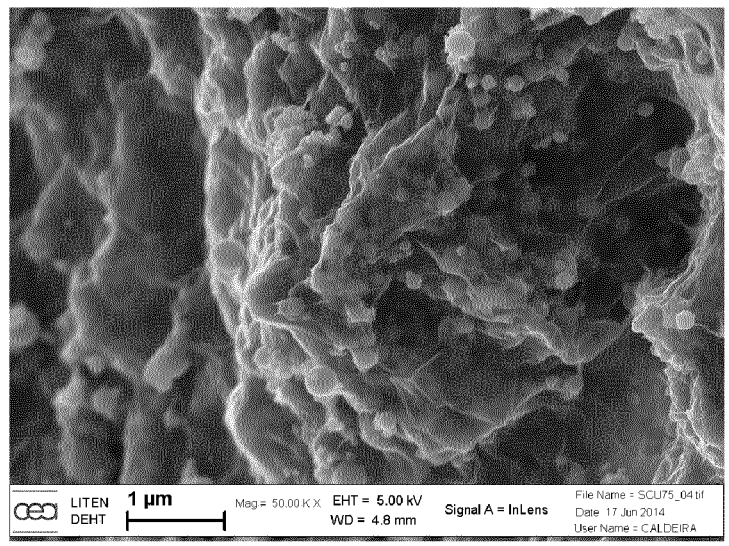

The obtained Si-Graphene-Graphite-PVA (SiGnGtPVA) is fired in a tubular furnace for 16 hours at 200° C. under air, then 6 hours at 600° C. and 3 hours 1,000° C. under argon atmosphere. This pyrolized product is milled by using a turbula. SEM picture of the composite is presented in FIG. 2.

Powder specifications and electrochemical performances of the Si-carbon composite particulate material are respectively shown in tables 1 and 2.

Example 5

A composite Silicon-graphite-graphene-carbon is prepared as the example 1 but with a different carbon-containing organic compound.

In this example, 1.8 grams of graphene nanoplatelets are dispersed with 2 grams of Silicon nanoparticles, 8.3 grams of graphite micropowder (BET surface 2.5 $m^2/g$) and 2.3 grams of Pitch (Battery grade) in butyl glycol acetate.

The resulted powder is fired in a tubular furnace for 3 hours at 1,000° C. under argon atmosphere. This pyrolized product is milled by turbula.

Powder specifications and electrochemical performances of the Si-carbon composite particulate material are respectively shown in tables 1 and 2.

Example 6

A composite Silicon-graphite-graphene-carbon is prepared as the example 1 but with different graphen and graphite materials.

A composite Silicon-graphite-graphene-carbon is prepared as the example 1 with a graphene aqueous suspension (Average particle diameter 0.2 to 5 μm and average thickness of approximately 15 nanometers) and graphite (BET surface 16.1 $m^2/g$).

Powder specifications of the Si-carbon composite particulate material are submitted in Table 1.

TABLE 1

| | BET (m2/g) | PSD D10, D50, D90 (μm) | | |
|---|---|---|---|---|
| Ex 1 | 3.9 | 8.5 | 20 | 49 |
| Ex 2 | 26.7 | 10.2 | 30.4 | 327.2 |
| Ex 3 | 7.8 | 9.2 | 16.1 | 25.1 |
| Ex 4 | 8.9 | 73.6 | 287 | 630 |
| Ex 5 | 4 | 8.5 | 28 | 74.3 |
| Ex 6 | 9.3 | 8 | 18.4 | 151.9 |

The electrochemical performances of the Si-carbon composite particulate materials obtained according to the previous examples are shown here-after in Table 2.

TABLE 2

|  | First Lithiation (mAh/g) | Initial Irreversible capacity (%) | Reversible delithiation (mAh/g) | Capacity retention (%/cycles) | Capacity Fading [3; 10] mAh/g/Cycles | Coulombic Efficiency (%) |
| --- | --- | --- | --- | --- | --- | --- |
| Ex 1 | 816 | 15 | 692 | 99.8 | −1.4 | 98.6 |
| Ex 2 | 694 | 16 | 582 | 100.02 | 0.10 | 98.7 |
| Ex 3 | 846 | 18 | 690 | 99.83 | −1.20 | 98.8 |
| Ex 4 | 934 | 19 | 761 | 99.83 | −1.30 | 98.6 |
| Ex 5 | 650 | 16 | 544 | 99.80 | −1.10 | 99.3 |
| Ex 6 | 858 | 18.3 | 701 | 99.95 | −0.35 | 98.8 |

The main parameters for practical applications are initial irreversible capacity, capacity retention and coulombic efficiency.

The most important is a high coulombic efficiency provide the other parameters are not far from the applications. In particular, the initial irreversible capacity has not to be high and in contrast the capacity retention has to be high.

For all the examples, coulombic efficiency is comprised between 98.6 to 99.3%.

In addition, for all examples, capacity retention is comprised between 99.8 to 100%/cycles.

Based on these values, it is clear that the addition of graphene and the use of silicon-graphite-graphene-carbon composites improve the electrochemical performances of anode for Li-ion batteries.

The invention claimed is:

1. An electrochemically active Si-carbon composite particulate material, wherein silicon nanoparticles are entrapped in a carbon matrix material, the carbon matrix material comprising:
   micronic graphite particles,
   reduced graphene platelets and
   amorphous carbon, wherein:
      the electrochemically active Si-carbon composite particulate material comprise particles having a distribution of size with 1 μm<D10<80 μm, 5 μm<D50<300 μm and 10 μm<D90<700 μm and a BET ranging from 2 to less than 26.7 m$^2$/g;
      the micronic graphite particles and reduced graphene platelets in a weight ratio graphite/graphene from 1.7 to 14; and
      the electrochemically active Si-carbon composite particulate material comprises Si ranging from 13 to 30% by weight of its total weight.

2. The composite particulate material according to claim 1, wherein the amorphous carbon is issued from the pyrolization of at least one carbon-containing organic compound.

3. The composite particulate material according to claim 1, wherein the silicon nanoparticles have an average particle size between 20 and 200 nm.

4. The composite particulate material according to claim 1, wherein the carbon matrix material is formed from 30 to 70 part by weight of the graphite, from 5 to 30 part by weight of the graphene, and from 5 to 20 part by weight of the amorphous carbon issued from a carbon-containing organic compound.

5. The composite particulate material according to claim 1, comprising silicon nanoparticles and micronic graphite particles in weight ratio Si/graphite from 0.05 to 0.8.

6. The composite particulate material according to claim 1, which is formed of micronic graphite particles coated by silicon nanoparticles, reduced graphene platelets, and amorphous carbon.

7. The composite particulate material according to claim 1, selected from $Si_{13}Gt_{64}Gn_{13}C_{10}$, or $Si_{10}Gt_{65}Gn_{14}C_{11}$, and $Si_{15}Gn_{15}Gt_{63}C_7$ wherein each element is calculated as % by weight.

8. A method for forming an electrochemically active material using of a Si-carbon composite particulate material comprising:
   (i) providing Si nanoparticles under a non-agglomerated form,
   (ii) contracting said Si nanoparticles with a solution containing at least one carbon-containing organic compound, and a dispersion of micronic graphite particles and of reduced graphene or graphene oxide platelets,
   (iii) drying the mixture of the previous step (ii) for forming a particulate material, which particles contain Si nanoparticles, micronic graphite particles, reduced graphene or graphene oxide platelets, and the carbon-containing organic compound, and
   (iv) thermally treating the particulate material of step (iii) so that the carbon-containing organic compound decomposes and graphene oxide, if present, reduces thereby obtaining a Si-carbon composite particulate material having silicon nanoparticles entrapped in a carbon matrix material based on at least micronic graphite particles, reduced graphene platelets and amorphous carbon, the Si-carbon composite particulate material comprising particles having a distribution of size with 1 μm<D10<80 μm, 5 μm<D50<300 μm and 10 μm<D90<700 μm and a BET ranging from 2 to less than 26.7 m$^2$/g; the micronic graphite particles and reduced graphene platelets in a weight ratio graphite/graphene from 1.7 to 14; and the electrochemically active Si-carbon composite particulate material comprises Si ranging from 13 to 30% be weight of its total weight.

9. An electrode comprising a Si-carbon composite particulate material according to claim 1 as an electrochemically active material.

10. The electrode of claim 9, wherein the electrode is a lithium ion battery anode.

11. A Lithium ion battery comprising an electrode of claim 9.

12. The composite particulate material according to claim 1, comprising silicon nanoparticles and micronic graphite particles in weight ratio Si/graphite from 0.1 to 0.3.

13. The composite particulate material according to claim 1, wherein the reduced graphene platelets have an oxygen content of less than 5% by weight.

14. The composite particulate material according to claim 1, wherein the amorphous carbon and graphene platelets form a coating on Si-graphite particles and/or Si-graphite particle agglomerates.

* * * * *